(12) United States Patent
Bieg

(10) Patent No.: US 10,074,023 B2
(45) Date of Patent: Sep. 11, 2018

(54) METHOD AND DEVICE FOR PREDICTING A LINE OF VISION OF A VEHICLE OCCUPANT

(71) Applicant: Robert Bosch GmbH, Stuttgart (DE)

(72) Inventor: Hans-Joachim Bieg, Weil im Schoenbuch (DE)

(73) Assignee: ROBERT BOSCH GMBH, Stuttgart (DE)

( * ) Notice: Subject to any disclaimer, the term of this patent is extended or adjusted under 35 U.S.C. 154(b) by 161 days.

(21) Appl. No.: 15/211,186

(22) Filed: Jul. 15, 2016

(65) Prior Publication Data

US 2017/0024624 A1 Jan. 26, 2017

(30) Foreign Application Priority Data

Jul. 22, 2015 (DE) .......................... 10 2015 213 769

(51) Int. Cl.
*G06K 9/00* (2006.01)
*G06F 3/00* (2006.01)
*G06F 3/01* (2006.01)

(52) U.S. Cl.
CPC ......... *G06K 9/00832* (2013.01); *G06F 3/005* (2013.01); *G06F 3/012* (2013.01); *G06F 3/013* (2013.01); *G06K 9/00604* (2013.01)

(58) Field of Classification Search
CPC ..................................................... G06F 3/013
USPC ..................................................... 348/148
See application file for complete search history.

(56) References Cited

U.S. PATENT DOCUMENTS

| 5,287,437 A | 2/1994 | Deering | |
| 5,793,310 A * | 8/1998 | Watanabe | G01C 21/3635 340/990 |
| 6,011,494 A * | 1/2000 | Watanabe | G01C 21/3635 340/990 |
| 8,085,140 B2 * | 12/2011 | Mochizuki | G08G 1/166 340/435 |
| 8,403,490 B2 * | 3/2013 | Sugiyama | G02B 27/0172 345/8 |

(Continued)

FOREIGN PATENT DOCUMENTS

DE 102013210746 A1 12/2014

OTHER PUBLICATIONS

Grindinger, "Eye Movement Analysis & Prediction With the Kalman Filter", Clemson University, 2006, 26 pages.

*Primary Examiner* — Paulos M Natnael
(74) *Attorney, Agent, or Firm* — Nortom Rose Fulbright US LLP; Gerard Messina

(57) ABSTRACT

A method for predicting a line of vision of an occupant of a vehicle. The method includes a step of reading in an initial line of vision of the vehicle occupant, a step of ascertaining a maximum speed of a present head and/or eye movement of the vehicle occupant, starting from the initial line of vision, using sensor data concerning a change in the visual angle of the vehicle occupant representing the present head and/or eye movement, a step of determining an expected magnitude of the present head and/or eye movement, represented with the aid of a predefined model, using the ascertained maximum speed, and a step of using the initial line of vision and the expected magnitude of the present head and/or eye movement to predict the line of vision of the vehicle occupant.

9 Claims, 3 Drawing Sheets

(56) References Cited

U.S. PATENT DOCUMENTS

| | | | | |
|---|---|---|---|---|
| 8,885,882 | B1* | 11/2014 | Yin | G06F 3/00 |
| | | | | 382/103 |
| 9,563,805 | B2* | 2/2017 | Cheung | A61B 3/113 |
| 9,883,177 | B2* | 1/2018 | Kim | H04N 13/0484 |
| 2006/0209013 | A1* | 9/2006 | Fengels | G06F 3/0325 |
| | | | | 345/156 |
| 2009/0303078 | A1* | 12/2009 | Mochizuki | B60W 40/02 |
| | | | | 340/901 |
| 2010/0060551 | A1* | 3/2010 | Sugiyama | G02B 26/06 |
| | | | | 345/8 |
| 2015/0022664 | A1* | 1/2015 | Pflug | H04N 7/181 |
| | | | | 348/148 |
| 2015/0054951 | A1* | 2/2015 | Maytal | G06K 9/00845 |
| | | | | 348/148 |
| 2015/0116206 | A1* | 4/2015 | Irie | G06F 3/012 |
| | | | | 345/156 |
| 2016/0018647 | A1* | 1/2016 | Osterhout | G02B 27/017 |
| | | | | 348/169 |
| 2016/0193104 | A1* | 7/2016 | Du | G02C 7/081 |
| | | | | 351/203 |
| 2017/0217447 | A1* | 8/2017 | Iguchi | B60W 50/14 |

* cited by examiner

METHOD AND DEVICE FOR PREDICTING A LINE OF VISION OF A VEHICLE OCCUPANT

CROSS REFERENCE

The present application claims the benefit under 35 U.S.C. 119 of German Patent Application No. DE 102015213769.4 filed on Jul. 22, 2015, which is expressly incorporated herein by reference in its entirety.

BACKGROUND INFORMATION

The present invention is directed to a method and a device for predicting a line of vision of a vehicle occupant. The subject matter of the present invention is also a computer program.

Estimates of the line of vision of a human observer are used in a wide range of technical systems. For example, assistance systems in vehicles measure the head and/or eye movements of the driver in order to ascertain whether the driver is still observing the road and paying attention to the traffic situation.

Estimates of the line of vision of an observer may be obtained by various methods. One important estimate is achieved through measurements of the orientation behavior for example in the form of head and eye movements of an observer. Measurements of the head and eye movements of an observer may be obtained by way of video-based tracking systems for the head and eye movements. Such systems are also known as head or eye tracking systems and usually estimate the head movements of the observer based on prominent facial features. In a second step, the eye and specific eye features, for example the pupil, the sclera or the corneal reflex, of the observer are detected. These features are used to estimate the eye rotation and to deliver a more accurate estimate of the line of vision of the observer. Whether a head or eye tracking system is able to determine the present head or eye position depends on the detection range of the sensor in question.

SUMMARY

Against this background, an embodiment of the present invention described herein provides a method for predicting a line of vision of a vehicle occupant, as well as a device which uses this method, and finally also a corresponding computer program. Advantageous refinements of and improvements on the device are described herein.

In accordance with the present invention, a line of vision of a vehicle occupant is predicted using a biomechanical relationship between an amplitude or magnitude and a speed of head or eye movements of the vehicle occupant and thus makes it possible to predict the end point of a head or eye movement based on an analysis of the speed thereof.

Advantageously, this new approach enables estimates of the line of vision even when the head or eye leaves the detection range, i.e., the area reliably detected by the head or eye tracking system. Gaps in the sensor data may thus be bridged in order to increase the reliability of the head or eye tracking system.

The prediction of the line of vision made possible by the present invention presented here may improve the reliability of estimates of changes in the line of vision of an observer even in surroundings with sparse sensor data due to limitations of the detection range.

A method for predicting a line of vision of an occupant of a vehicle is presented, the method including the following steps:
reading in an initial line of vision of the vehicle occupant;
ascertaining a maximum speed of a present head and/or eye movement of the vehicle occupant, starting from the initial line of vision, using sensor data concerning a change in the visual angle of the vehicle occupant representing the present head and/or eye movement;
determining an expected magnitude of the present head and/or eye movement, represented by a predefined model, using the ascertained maximum speed; and
using the initial line of vision and the expected magnitude of the present head and/or eye movement to predict the line of vision of the vehicle occupant.

The method may be carried out in a road vehicle. The vehicle occupant may be a driver of the vehicle. The line of vision may be an estimated line of vision of the vehicle occupant. The initial line of vision may be depicted by vectors in three-dimensional space and may provide a piece of information regarding which area of the surroundings the vehicle occupant was visually focused on prior to the present head and/or eye movement. The initial line of vision may be detected by an optical sensor directed toward the occupant and may be provided with the aid of sensor data for being read in. The magnitude of the head and/or eye movement may be understood to mean an angle by which the line of vision of the eyes and/or of the head is changed.

The head and/or eye movement may be a rotational movement of the head or of an eye or of both eyes of the vehicle occupant about the rotation axis and transverse axis (pitch axis). The maximum speed may be achieved for example approximately in the middle of the head and/or eye movement. The change in the visual angle may represent a deviation of a visual angle of the vehicle occupant, predefined by the initial line of vision, relative to a rest position. The sensor data may be electrical signals from an optical sensor of the vehicle.

The predefined model may be described with the aid of mathematical formulas and may be designed to express the main parameters of the biomechanical relationship between the magnitude and the speed of head or eye movements. The expected magnitude of the present head and/or eye movement may be expressed for example by a number of degrees of the rotational movement of the head or of the eye between the initial line of vision and the line of vision that is to be estimated.

The line of vision of the vehicle occupant that is to be predicted may also be depicted using at least two position data for example with the aid of a vector in three-dimensional space and may provide information regarding which area of the surroundings the vehicle occupant will be focused on at the end of the present head and/or eye movement.

This method may be implemented for example in software or hardware or in a mixed form of software and hardware for example in a control device.

According to one specific embodiment, the method may include a step of reading in the sensor data concerning a change in the visual angle of the vehicle occupant, representing the present head and/or eye movement, via an interface from an optical sensor of the vehicle. Up-to-date sensor data may thus always be provided in real time.

According to a further specific embodiment, the step of determining an expected magnitude of the present head and/or eye movement may be carried out when the maximum speed ascertained in the step of ascertaining exceeds and/or has exceeded a predefined speed threshold value. It is thus advantageously possible to save computing capacity since the method is carried out only when the present head and/or eye movement is expected to end outside of the detection range of the sensor providing the sensor data.

In a further specific embodiment of the approach proposed here, in the step of determining, a model may be used as the predefined model which is calculable using a stored formula. The model may thus be better adapted to the present head and/or eye movement.

Alternatively, in the step of determining, a model implemented as a look-up table may be used as the predefined model. With this specific embodiment, computing capacity may be saved and the model may be provided more quickly.

Furthermore, in the step of determining, a model may be used as the predefined model which is based on an empirical evaluation of head and/or eye movements of a person and/or of the vehicle occupant. The model may thus advantageously be individually adapted.

According to a further specific embodiment, in the step of determining, a model may be used as the predefined model which is adaptable using at least one adaptation parameter, in particular which is adaptable to an operational environment in the vehicle by the at least one adaptation parameter. The model may thus be adapted even more precisely to the present head and/or eye movement.

For example, an adaptation parameter may be used as the adaptation parameter which is establishable and/or is established in a manner specific to the vehicle occupant. This enables the model to be individually adapted to the greatest possible extent.

According to one specific embodiment, an adaptation parameter which is establishable and/or is established in a manner specific to the vehicle occupant may be used as the adaptation parameter which is establishable and/or is established in a manner specific to the vehicle occupant which is ascertained with the aid of a statistical estimation method, for example a maximum likelihood estimator. As a result, the model and/or the adaptation parameter(s) may be adjusted to the specific operational scenario in a simple manner using a perfected and tested procedure.

The approach presented here also provides a device which is designed to carry out, control or implement the steps of a variant of a method presented here in suitable devices. The object of the present invention may also be achieved quickly and efficiently by this embodiment variant of the present invention in the form of a device.

A device may be understood here to mean an item of electrical equipment which processes sensor signals and outputs control signals and/or data signals as a function thereof. The device may have an interface which may hardware-based and/or software-based. If it is hardware-based, the interfaces may for example be part of a so-called system ASIC which contains various functions of the device. However, it is also possible that the interfaces are dedicated, integrated circuits or are made up at least partially of discrete components. If it is software-based, the interfaces may be software modules which are present for example on a microcontroller alongside other software modules.

Also of advantage is a computer program product or a computer program containing program code which may be stored on a machine-readable carrier or storage medium such as a semiconductor memory, a hard drive memory or an optical memory and is used to carry out, implement and/or control the steps of the method according to one of the specific embodiments described above, in particular when the program product or program is executed on a computer or a device.

Exemplary embodiments of the present invention are shown in the figures and are described in greater detail below.

DETAILED DESCRIPTION OF EXAMPLE EMBODIMENTS

Figure 1:
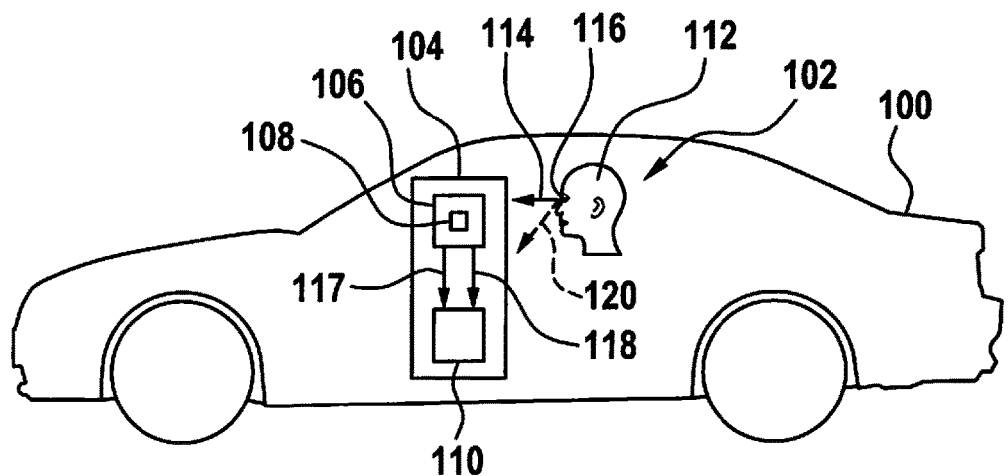
FIG. 1 shows a schematic diagram of a vehicle including a device for predicting a line of vision of an occupant of a vehicle according to one exemplary embodiment.

In the following description of advantageous exemplary embodiments of the present invention, identical or similar reference numerals will be used for the elements which act similarly and which are shown in the different figures, a repeated description of the elements being omitted.

FIG. 1 shows a schematic diagram of a vehicle 100. Vehicle 100 is a road vehicle such as a passenger car or a truck. A vehicle occupant 102, here a driver 102, of vehicle 100 is also shown.

Vehicle 100 is equipped with a movement tracking system 104 for tracking movements of vehicle occupant 102. Movement tracking system 104 may be designed as a head tracking system or eye tracking system. When designed as a head tracking system, movement tracking system 104 is designed to track head movements, in particular rotational movements of the head, of occupant 102. When designed as an eye tracking system, movement tracking system 104 is designed to track eye movements, in particular rotational movements of the eye, of occupant 102.

The task of head or eye tracking system 104 is to establish whether vehicle occupant 102 is or is not paying attention to the traffic situation, particularly when the occupant is the driver of vehicle 100. Hereinbelow, therefore, vehicle occupant 102 will also be referred to as observer 102. Using such data from head or eye tracking system 104, driver assistance or warning systems of vehicle 100 may be activated if necessary.

According to one exemplary embodiment, head or eye tracking system 104 includes a vehicle camera 106 having an optical sensor 108 and also a device 110 for predicting or estimating a line of vision of vehicle occupant 102. Vehicle camera 106 is situated in the vehicle interior and is directed toward a head 112 of vehicle occupant 102.

Optical sensor 108 of camera 106 is designed to detect an initial line of vision 114 of vehicle occupant 102 and also a head or eye movement (not shown in FIG. 1) of vehicle occupant 102 starting from initial line of vision 114. Within a predefined detection range of optical sensor 108, the latter is able to detect fully any head or eye movements of vehicle occupant 102. Movements of occupant 102 which take place outside of the detection range may no longer be detected by sensor 108.

Initial line of vision 114 is depicted with the aid of a vector in FIG. 1. The head or eye movement may in particular be a sideward, upward or downward rotational movement of head 112 or of an eye 116 of vehicle occupant 102.

In the exemplary embodiment shown in FIG. 1, device 110 is integrated into head or eye tracking system 104. According to an alternative exemplary embodiment, device 110 may also be situated outside of head or eye tracking system 104 and may be connected to head or eye tracking system 104 via electrical leads.

Device 110 is designed to read in initial line of vision 114 and also sensor data 118 concerning a change in the visual angle of vehicle occupant 102, representing the present head and/or eye movement, via a suitable interface from vehicle camera 106. Using the information obtained, device 110 then ascertains a peak speed or maximum speed of the present head and/or eye movement represented by the change in the visual angle.

Device 110 then uses the ascertained maximum speed and a predefined model of a human head or eye movement to determine an expected magnitude of the present head and/or eye movement. The magnitude describes here an extent of the head or eye movement, i.e., it indicates by how many degrees head 112 or eye 116 is rotated from initial line of vision 114 until reaching the line of vision at the end of the movement. The magnitude may thus also be referred to as the amplitude.

Knowing the initial line of vision and the expected magnitude of the present head and/or eye movement, device 110 is able to predict a line of vision 120 of vehicle occupant 102.

Predicted line of vision 120 is illustrated as a dashed-line vector in FIG. 1.

FIG. 1 shows a setup including a video-based head or eye tracking system 104 with a single camera 106 which is directed toward the front of observer 102. However, device 110 presented here may also be used in combination with another arrangement or a system having multiple cameras or a non-video-based head or eye tracking system.

Head or eye tracking system 104 delivers measurements of the present angle of the line of vision at constant time intervals, for example 60 samples per second. System 104 is not bound to a specific sampling rate. Device 110 is designed to analyze the provided angle information. Device 110 thus calculates the speed of the provided angle signal.

According to exemplary embodiments, this derived signal is used to determine the start of individual movements, here the present head or eye movement, using a speed threshold value. In a second step, device 110 determines the peak speed or maximum speed of this specific movement. As soon as the peak speed of the movement has been reached and measured by system 104, the expected magnitude or amplitude A of the movement, i.e., the movement end point, is calculated as follows:

$$A = -\ln(1 - V_{peak}/V_{max}) \times C$$

$V_{peak}$ denotes the measured maximum speed; ln denotes the natural logarithm; $V_{max}$ and C are constants which are adapted to the respective movement, i.e., a head or eye movement. Exemplary values are $V_{max}=500$ degrees/s, C=15 degrees in the case of human eye movements; other values of the constants are possible. Other formulations of the relationship are also possible.

Implementations may either directly calculate the amplitude or read the value from a pre-calculated look-up table. The constants may also be automatically determined individually for each individual observer 102. This is achieved by measuring the amplitudes and maximum speeds of smaller head or eye movements which take place entirely within the sensor range. The parameters may be obtained by standard methods from statistical estimation, such as for example the maximum likelihood method.

Expanding head or eye tracking system 104 by device 110 enables a reliable prediction of the end point of a movement of vehicle occupant 102 which starts within the detection range of optical sensor 108 but ultimately head 112 or eye 116 of vehicle occupant 102 moves out of the detection range.

Figure 2:
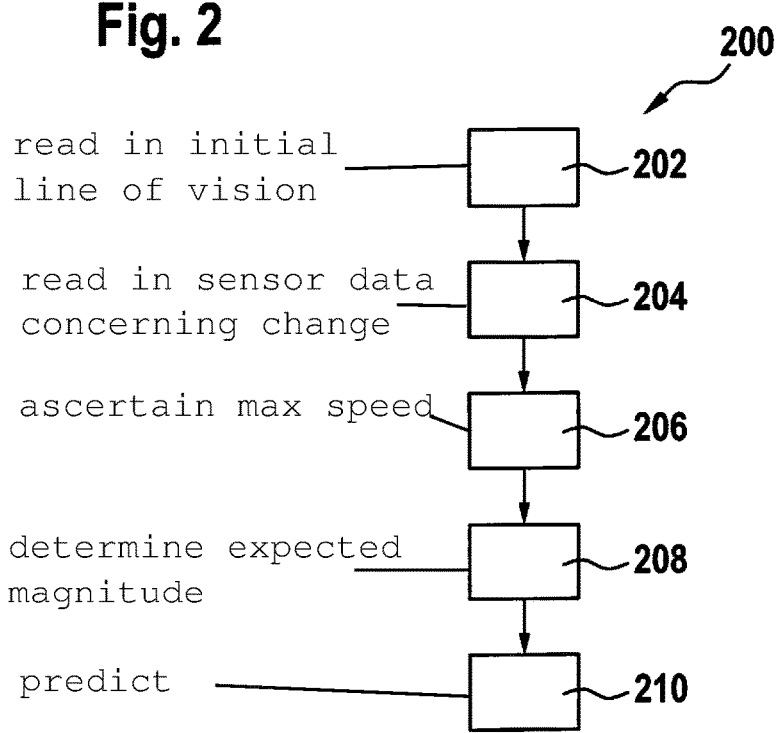
FIG. 2 shows a flowchart of a method for predicting a line of vision of an occupant of a vehicle according to one exemplary embodiment.

FIG. 2 shows a flowchart of an exemplary embodiment of a method 200 for predicting a line of vision of an occupant of a vehicle. Method 200 may be carried out by the device shown in FIG. 1 for predicting a line of vision of an occupant of a vehicle.

In a step of reading in 202, an initial line of vision of the vehicle occupant is read in. In a further step of reading in 204, sensor data concerning a change in the visual angle of the vehicle occupant is read in from an optical sensor of the vehicle via an interface, where the change in the visual angle represents a present head and/or eye movement of the vehicle occupant.

In a step of ascertaining 206, a maximum speed of the head and/or eye movement of the vehicle occupant is ascertained using the sensor data concerning a change in the visual angle of the vehicle occupant. In a step of determining 208, the maximum speed ascertained in step 206 is used to determine an expected magnitude of the present head and/or eye movement, represented with the aid of a predefined model. In a step of using 210, the initial line of vision and the expected magnitude of the present head and/or eye movement are used to predict or estimate a line of vision of the vehicle occupant.

According to one exemplary embodiment of method 200, the step of determining 208 an expected magnitude of the present head and/or eye movement is carried out only when the maximum speed ascertained in the step of ascertaining 206 exceeds a predefined speed threshold value. This ensures that the line of vision of the vehicle occupant is estimated only when it is highly likely that the movement of the vehicle occupant will end at a position at which the head or eye has moved out of the detection range of the sensor.

Depending on the exemplary embodiment of method 200, in the step of determining 208, different predefined models may be used to determine the expected magnitude of the present head and/or eye movement.

For example, a model may be used which is calculable using a formula stored in the head or eye tracking system or in a control device of the vehicle. Alternatively, use may be made of a model implemented as a look-up table in the head or eye tracking system. In particular, a model may be used which is based on an empirical evaluation of head and/or eye movement models of the present vehicle occupant.

It is also possible to use as a basis a model which is adaptable using one or multiple adaptation parameters. According to one exemplary embodiment, the adaptation parameters may be establishable in a manner specific to the vehicle occupant, for example, ascertained with the aid of a maximum likelihood estimator.

Figure 3:
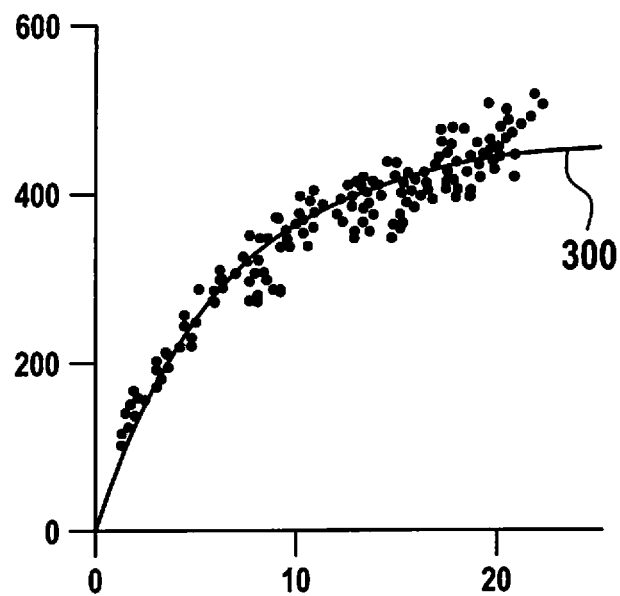
FIG. 3 shows a diagram to illustrate the relationship between magnitude and maximum speed of an eye movement according to one exemplary embodiment.

FIG. 3 shows a diagram to illustrate a typical relationship between a magnitude or amplitude of an eye movement or saccade and the maximum speed thereof according to one exemplary embodiment. Here, the saccade is to be understood to mean a rotational movement of the eye.

A Cartesian coordinate system is shown. Values for exemplary amplitudes of a saccade are plotted on the abscissa in degrees between 0 and 20. Values for exemplary maximum speeds of a saccade are plotted on the ordinate from 0 degrees per second to 600 degrees per second. A graph 300 illustrates the relationship between magnitude and maximum speed of saccades. As shown in the diagram, graph 300, which starts at the zero point, rises in a strictly monotonous manner, the slope thereof being steep at first and then becoming gradually less steep.

The diagram in FIG. 3 shows that eye movements of lower maximum speed are characterized by a small amplitude and the amplitudes become larger as the maximum speed increases.

This relationship between magnitude and maximum speed of a saccade may be modeled by way of an exponential function. The inverse function described herein may be used to determine the end point of the eye movement.

The dynamic in the case of eye movements which is illustrated by way of example in FIG. 3 essentially also describes the dynamic in the case of head movements.

Figure 4:
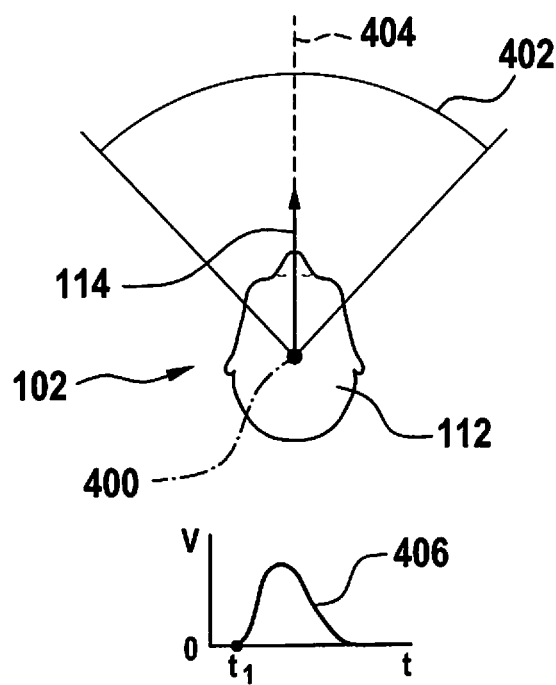
FIGS. 4 through 6 show schematic diagrams of a head rotation having a typical speed curve according to exemplary embodiments.
Figure 5:
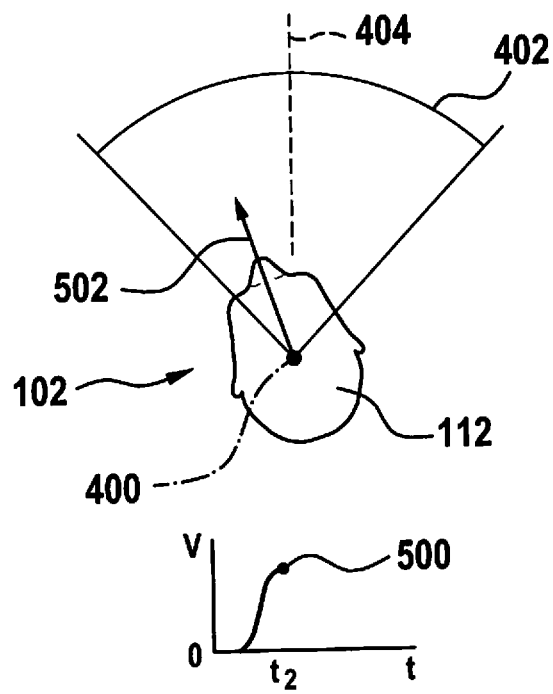
Figure 6:
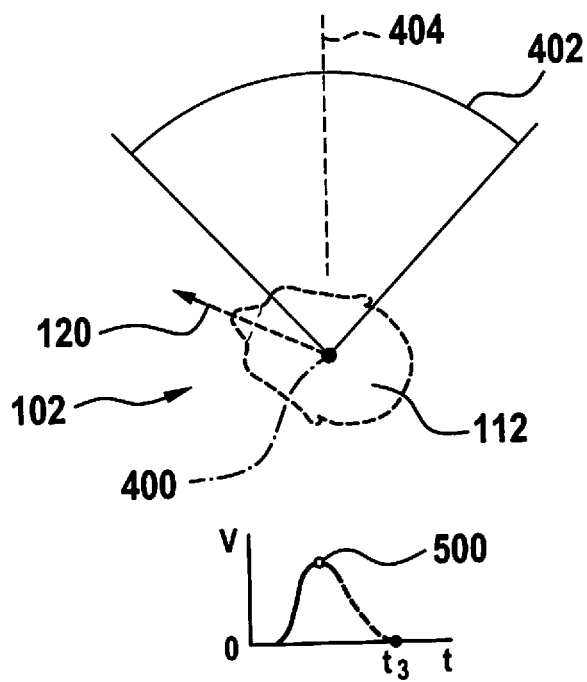

FIGS. 4 through 6 show schematic diagrams of a head rotation having a typical speed curve according to exemplary embodiments. In each case, head 112 of observer 102 is shown in a top view. A sector of a circle, the origin of which lies at a center point of head 112 representing an axis of rotation 400 of head 112, represents a detection range 402 of a sensor system (not shown in FIGS. 4 through 6) which is directed toward head 112.

The detection range 402 is the area around the head center point 400 within which the sensor system may detect the exact position of head 112. The sensor system may be for example a camera directed toward the front of observer 102, as shown in FIG. 1. The sensor system is designed to detect a change in the visual angle of observer 102, which represents a present rotational movement of the head and/or eye of observer 102. A vector starting at axis of rotation 400 denotes respective directions of observation of observer 102 at certain angle positions of the change in the visual angle.

FIG. 4 shows head 112 in a position which is defined here as rest position 404 and in which observer 102 is holding head 112 straight and is looking straight ahead. In the diagram in FIG. 4, rest position 404 is denoted by a dashed line. The vector in FIG. 4 denotes initial line of vision 114 of observer 102 prior to a head rotation. The angle position of the vector that is to be detected by the sensor system lies at zero degrees in accordance with the illustrated head position defined as the rest position according to one exemplary embodiment. In the diagram in FIG. 4, head 112 is located centrally in detection range 402 and is detected by the sensor system.

A diagram shown at the bottom in FIG. 4 shows a typical curve of a head rotation of a certain magnitude over time. The time t is plotted on the abscissa of a Cartesian coordinate system, and the speed v is plotted on the ordinate of the Cartesian coordinate system. A graph 406 illustrates the typical curve of a head rotation of predetermined magnitude.

At a point in time $t_1$, head 112 is still in initial line of vision 114, and the speed of the head rotation is zero. If, starting from initial line of vision 114, observer 102 carries out the head rotation to the left or to the right, the speed of rotation rapidly increases in the first half of the rotational movement in order, after reaching the maximum speed which is denoted by the apex of graph 406, to decrease again to zero in a more gradual slope to the end of the head rotation. Graph 406 may be used as a model for a head rotation of observer 102 having the same amplitude.

FIG. 5 once again shows head 112 of observer 102 from above. Here, a head rotation of observer 102 to the left has started from the initial line of vision, and head 112 is shown in a position upon reaching a maximum speed $V_{peak}$ 500 of the head rotation at a point in time $t_2$, as illustrated by the diagram shown at the bottom of the figure. A present line of vision 502 of observer 102 lies at an angle of approximately 15 degrees relative to the initial line of vision in rest position 404.

The diagram in FIG. 5 shows that head 112 of observer 102 is still within detection range 402 of the sensor system at point in time $t_2$ of the head rotation, and the head movement of observer 102 is thus still being reliably detected by the sensor system.

FIG. 6 shows head 112 of observer 102 at the end of the exemplary head rotation. Here, head 112 is located outside of detection range 402 of the sensor system, so that the latter may no longer detect the end point of the head rotation and hence a present line of vision of observer 102.

The embodiment of the present invention presented herein of detecting the speed of the head rotation in order to estimate the line of vision after leaving sensor area 102 comes to bear here. Using the model shown in FIG. 5 for a head rotation, the further values for the rotational movement are extrapolated starting from the last detected sensor value in order to define an end point of the rotational movement at a point in time $t_3$. New line of vision 120, situated outside of the sensor detection range 402, is estimated as a function of $t_3$.

FIGS. 4 through 6 show that extensive lateral rotations of head 112 result in head rotations which may no longer be precisely determined by the sensor system since they are located outside of detection range 402. According to the embodiment presented here, a kinematic analysis of the head movement within detection range 402 is used to determine the end point of the head rotation outside of detection range 402 of the sensor.

Possible fields of application for the concept presented here lie, for example, in sensor technology for detecting human movements, in particular in technologies for tracking head or eye movements in conjunction with driver-monitoring cameras and systems.

If an exemplary embodiment includes an "and/or" linkage between a first feature and a second feature, this is to be understood to mean that the exemplary embodiment has both the first feature and the second feature in one specific embodiment and either only the first feature or only the second feature in another specific embodiment.

What is claimed is:

1. A method for predicting a line of vision of an occupant of a vehicle, the method comprising:

reading in, via a processor, an initial line of vision of the vehicle occupant;

ascertaining, via the processor, a maximum speed of at least one of a present head movement and a present eye movement of the vehicle occupant, starting from the initial line of vision, using sensor data concerning a change in a visual angle of the vehicle occupant representing the at least one of the present head movement and the present eye movement;

determining, via the processor, an expected magnitude of the present head movement and the present eye movement, represented by a predefined model, using the ascertained maximum speed; and predicting, via the processor, using the initial line of vision and the expected magnitude of the at least one of the present head movement and present eye movement, the line of vision of the vehicle occupant;

wherein the line of vision is provided for use in an assistance system of the vehicle which tracks the vehicle occupant, wherein, in the determining, a model is used as the predefined model which is adaptable using at least one adaptation parameter, the at least one adaptation parameter being adaptable to an operational environment in the vehicle by the at least one adaptation parameter, and wherein an adaptation parameter is used as the adaptation parameter which is provided in a manner specific to the vehicle occupant.

2. The method as recited in claim 1, further comprising:
reading in, via the processor, the sensor data concerning the change in the visual angle of the vehicle occupant, representing the at least one of the present head movement and the present eye movement, via an interface from an optical sensor of the vehicle.

3. The method as recited in claim 1, wherein the determining of the expected magnitude of the at least one of the present head movement and the present eye movement is carried out when the maximum speed ascertained in the ascertaining step at least one of exceeds and has exceeded a predefined speed threshold value.

4. The method as recited in claim 1, wherein, in the determining, a model is used as the predefined model which is calculable using a stored formula.

5. The method as recited in claim 1, wherein, in the determining, a model implemented as a look-up table is used as the predefined model.

6. The method as recited in claim 1, wherein, in the determining, a model is used as the predefined model which is based on an empirical evaluation of at least one of head movements and eye movements of at least one of a person and of the vehicle occupant.

7. The method as recited in claim 1, wherein an adaptation parameter which is provided, in a manner specific to the vehicle occupant is used as the adaptation parameter which is provided in a manner specific to the vehicle occupant and which is ascertained with the aid of a statistical estimation method, the statistical estimation method being a maximum likelihood estimator.

8. A device for predicting a line of vision of an occupant of a vehicle, comprising:
a non-transitory machine-readable storage medium, on which is stored a computer program, which is executable by a processor, including:
a program code arrangement having program code for predicting a line of vision of an occupant of a vehicle, by causing the processor to perform the following:
reading in, via the processor, an initial line of vision of the vehicle occupant;
ascertaining, via the processor, a maximum speed of at least one of a present head movement and a present eye movement of the vehicle occupant, starting from the initial line of vision, using sensor data concerning a change in a visual angle of the vehicle occupant representing the at least one of the present head movement and the present eye movement;
determining, via the processor, an expected magnitude of the present head movement and the present eye movement, represented by a predefined model, using the ascertained maximum speed; and
predicting, via the processor, using the initial line of vision and the expected magnitude of the at least one of the present head movement and present eye movement, the line of vision of the vehicle occupant;

wherein the line of vision is provided for use in an assistance system of the vehicle which tracks the vehicle occupant, wherein, in the determining, a model is used as the predefined model which is adaptable using at least one adaptation parameter, the at least one adaptation parameter being adaptable to an operational environment in the vehicle by the at least one adaptation parameter, and wherein an adaptation parameter is used as the adaptation parameter which is provided in a manner specific to the vehicle occupant.

9. A non-transitory machine-readable storage medium, on which is stored a computer program, which is executable by a processor, comprising:
a program code arrangement having program code for predicting a line of vision of an occupant of a vehicle, by causing the processor processing device to perform the following:
reading in, via the processor, an initial line of vision of the vehicle occupant;
ascertaining, via the processor, a maximum speed of at least one of a present head movement and a present eye movement of the vehicle occupant, starting from the initial line of vision, using sensor data concerning a change in a visual angle of the vehicle occupant representing the at least one of the present head movement and the present eye movement;
determining, via the processor, an expected magnitude of the present head movement and the present eye movement, represented by a predefined model, using the ascertained maximum speed; and
predicting, using the initial line of vision and the expected magnitude of the at least one of the present head movement and present eye movement, the line of vision of the vehicle occupant;

wherein the line of vision is provided for use in an assistance system of the vehicle which tracks the vehicle occupant, wherein, in the determining, a model is used as the predefined model which is adaptable using at least one adaptation parameter, the at least one adaptation parameter being adaptable to an operational environment in the vehicle by the at least one adaptation parameter, and wherein an adaptation parameter is used as the adaptation parameter which is provided in a manner specific to the vehicle occupant.

\* \* \* \* \*